United States Patent [19]
Johnson et al.

[11] Patent Number: 5,199,489
[45] Date of Patent: Apr. 6, 1993

[54] METHOD OF CEMENTING WELL CASING TO AVOID GAS CHANNELLING FROM SHALLOW GAS-BEARING FORMATIONS

[75] Inventors: Les Johnson; Brian Sissons; Kerry Crapo, all of Medicine Hat, Canada

[73] Assignee: Dowell Schlumberger Incorporated, Tulsa, Okla.

[21] Appl. No.: 621,399

[22] Filed: Nov. 30, 1990
(Under 37 CFR 1.47)

[30] Foreign Application Priority Data
Dec. 1, 1989 [CA] Canada ................................. 2004393

[51] Int. Cl.$^5$ ..................... F21B 33/138; F21B 33/16
[52] U.S. Cl. .................................. 166/250; 166/291; 166/292
[58] Field of Search ............... 166/250, 253, 285, 291, 166/292, 293

[56] References Cited
U.S. PATENT DOCUMENTS

| | | | |
|---|---|---|---|
| 2,075,882 | 4/1937 | Brantly | 166/291 X |
| 2,206,389 | 7/1940 | Cannon | 166/291 X |
| 3,196,946 | 7/1965 | Lauffer | 166/285 |
| 4,210,455 | 7/1980 | Metcalf et al. | 106/728 X |
| 4,333,764 | 6/1982 | Richardson | 106/681 X |
| 4,602,685 | 7/1986 | McKenzie et al. | 166/293 |
| 4,655,286 | 4/1987 | Wood | 166/285 |
| 4,767,460 | 8/1988 | Parcevaux et al. | 106/696 X |
| 4,924,942 | 5/1990 | Shen | 166/291 |
| 5,020,594 | 6/1991 | Gill | 166/250 |
| 5,036,496 | 7/1991 | Rutledge | 367/35 |

OTHER PUBLICATIONS

Smith, Dwight K., "Cementing Additives", *Cementing*, 1987, pp. 18, 19, 20, 36.

Primary Examiner—George A. Suchfield
Attorney, Agent, or Firm—Stephen A. Littlefield

[57] ABSTRACT

Gas channeling to the surface in the setting of surface casing can be avoided by employing a cementing process in which a right-angle setting cement is positioned within a wellbore annulus between the wellbore and the casing above a gas-bearing zone with a low fluid loss cement slurry being placed below the right-angle setting cement. Pumping of the cement slurry is stopped for a period of time to allow the setting of the right-angle setting cement at which point pressurized pumping is resumed to displace remaining portions of the low fluid loss cement slurry into the wellbore annulus against the plug created by the set right-angle setting cement to block off gas migration and squeeze the low fluid loss cement into the gas-bearing zone.

5 Claims, 2 Drawing Sheets

METHOD OF CEMENTING WELL CASING TO AVOID GAS CHANNELLING FROM SHALLOW GAS-BEARING FORMATIONS

This invention relates to the art of well cementing and, more particularly, to a process for preventing gas migration from shallow gas-bearing formations in the setting of surface well casing.

BACKGROUND OF THE INVENTION

In the process of drilling a well to a fluid-bearing subterranean formation, a first, relatively large borehole is drilled to a depth of about 100 to 200 meters. A tubular well casing, commonly referred to as surface casing is then lowered into the initial, large diameter wellbore and is cemented in place by a process in which a cement slurry is forced downwardly through the central bore of the casing to the bottom of the casing and then upwardly within the annulus created by a outer surface of the casing and the wellbore wall, the cement being forced through the annulus to the surface. Upon setting of the cement, the casing is rigidly located within the borehole and drilling proceeds using a smaller diameter drill bit to pass through the casing to the bottom of the original borehole and downwardly to the desired formation. In a typical well drilling operation, several strings of casing, each of a reduced diameter from that of the preceding casing string is run into the open hole and cemented in place.

It is common in some drilling environments to pass through formations containing water or hydrocarbon fluids such as gas on the way to the desired depth of the well. Migration of these fluids in the wellbore annulus can cause contamination of one fluid source with another. Of particular concern is the contamination of ground water and the migration of gas which presents a significant environmental and safety hazard.

Hydrostatic forces of a fluid column, such as drilling mud, are usually sufficient to overcome the formation pressure to inhibit any gas migration so long as a fluid capable of transmitting hydrostatic forces is in place in the wellbore. Difficulty arises, however, during the process of the setting or hardening of cement in the cementing of well casing. As a cement sets, it no longer produces or transmits any hydrostatic force which counters the formation pressure tending to release gas into the wellbore. As a result, gas begins to channel through the setting cement and upwardly in the wellbore annulus with the potential of contaminating higher level formations and/or creating an environmental and safety hazard.

With gas formations encountered below the surface casing such as in the second or later casing string, the already set cement locating the surface casing in place acts as an effective plug against such vertical gas migration to the surface. Additionally, the solid surface casing cement can act as a plug against which pressurized fluid can be pumped into the problem areas to squeeze off further gas channelling.

Difficulty arises, however, when a gas-bearing formation is encountered in the first 100 to 200 meters of the wellbore, that is, prior to the setting of the surface casing. Such shallow gas formations have been encountered in the southeastern Alberta and Lloydminster areas of Canada wherein gas-bearing formations as shallow as 50 meters or less have been encountered. Gas channelling in the cementing of surface casing has proven to be a very difficult problem in these areas having shallow gas-bearing formations. Additionally, new laws in these areas now require a cementing process which eliminates such gas migration if it is encountered.

Attempts to use conventional casing cementing techniques do not overcome the gas channelling problem. The main cause of gas channelling is hydrostatic pressure reduction in the setting slurry resulting from fluid loss to the surrounding formation, loss of water through hydration with the cement and chemical contraction of the cement matrix. In this process, the internal pressure within the cement slurry falls to the hydrostatic pressure of water which is typically lower than the formation pressure making gas entry into the wellbore annulus and into and through cement inevitable.

One attempt to overcome this problem has been to use a right-angle setting cement which has an extremely short transition time from a true liquid state to a true solid state. It was theorized that, since the critical time for gas channelling is during the setting transition period for the cement, a right-angle setting cement having a short transition time would overcome the problem. However, right-angle setting cements generally have low long-term compressive strength and begin to break down after drill-out of the surface casing has occurred resulting in gas leakage to the surface.

Another proposed method to overcome the problem of gas leakage from shallow formations is the use of so-called expansive cement in which a gas-generating agent such as aluminum powder is incorporated into the cement slurry to expand it during the transition period. However, insufficient hydrostatic pressure is developed to hold the generated gas in place resulting in the gas simply expanding and bubbling to the surface through the slurry, adding to rather than solving the gas channelling problem.

Another technique involves the step of hesitating the displacement of a conventional cement slurry for a two to three hour period. The increased viscosity of the slurry as it setting caused increased friction pressures which were effective against gas channelling so long as the pressure was transmitted to the gas-bearing zone. However, there was no way to control where the pressure was applied.

SUMMARY OF THE INVENTION

The present invention allows the setting of surface casing in areas of shallow gas formations while avoiding the problems of gas migration through the cement thereby avoiding interzonal contamination and environmental and safety hazards associated with gas channelling.

In accordance with the invention, a right-angle setting cement is placed in a wellbore/casing annulus near the surface and above a gas-bearing zone. Following setting of the right-angle setting cement, a low fluid loss cement slurry is then squeezed, under high pressure, into the wellbore annulus below the right-angle setting cement to seal off gas migration into the wellbore.

Further in accordance with the invention, the right-angle setting cement is displaced into its desired position as described above by pumping the low fluid loss slurry behind the right-angle setting cement.

It is therefore an object of this invention to provide a method whereby gas channelling from shallow gas-bearing formations is avoided in the cementing of surface casing in a wellbore.

It is another object of this invention to provide a process whereby a pressurized fluid may be used in the cementing of surface casing in order to stop gas migration into the wellbore.

BRIEF DESCRIPTION OF THE DRAWINGS

These and other objects of the invention are accomplished through the method of the present invention to be described hereinafter and in conjunction with the accompanying drawings forming a part of this specification and in which.

DETAILED DESCRIPTION OF THE PREFERRED EMBODIMENTS AND THE DRAWINGS

Certain terms will be used in this specification and claims to describe the pumping sequence and the position of various fluids in the casing bore and the casing/wellbore annulus. As used in this specification, a fluid which is pumped prior to a second fluid will be described as being pumped "ahead of" the second fluid while the second fluid is pumped "behind" the first fluid. In a similar manner, a fluid slug will be termed "above" another fluid slug when its position either in the casing bore or within the casing/wellbore annulus is toward the surface relative to a second fluid slug. Similarly, the second fluid slug will be termed "below" the first fluid slug if its position in the casing bore or the casing/wellbore annulus is farther away from the surface relative to the first slug. Thus, for example, a first fluid slug pumped ahead of a second fluid slug would be below the second fluid slug in the casing bore but above the second fluid slug in the casing/wellbore annulus.

Figure 1:
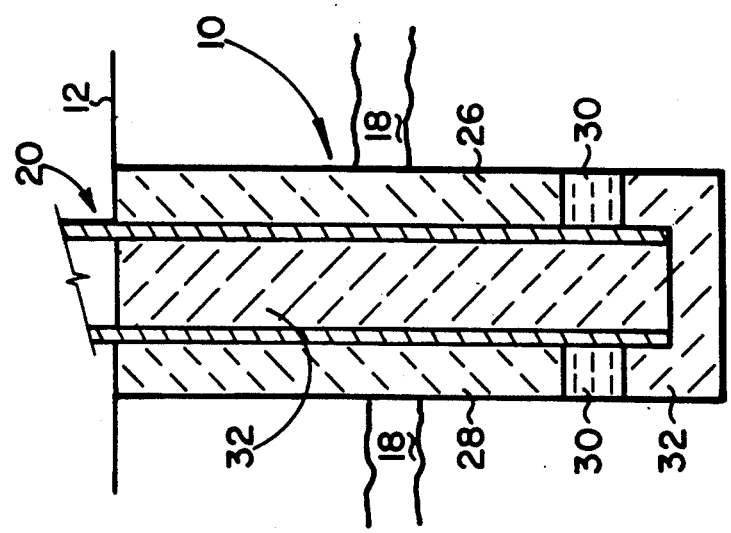
FIGS. 1 through 6 illustrate the preferred process of the present invention in the sequential steps of gauging the hole (FIG. 1); injecting a spacer (FIG. 2); injecting the right-angle setting cement slurry (FIG. 3); injecting a low fluid loss cement slurry (FIG. 4); displacing the right-angle setting cement slurry to the desired position (FIG. 5) and squeezing a low fluid loss cement slurry into the wellbore annulus below the right-angle setting cement following setting thereof (FIG. 6).

Referring now to the drawings wherein the showings are for the purpose for illustrating a preferred embodiment of the invention only and not for the purpose of limiting same, FIG. 1 shows a wellbore 10 extending generally vertically downwardly from an earth surface 12 through various earth strata 14 and having a bottom 16. The wellbore 10 passes through a gas-bearing zone 18 in its passage through the earth strata 14 from the earth surface 12 to the bottom 16. It will be understood that the relative dimensions of the figures of the drawings are exaggerated in various ways to better illustrate the invention and that the wellbore 10 is generally considerably deeper relative to its width or diameter.

When it is desired to place a casing 20 having a generally cylindrical bore 22 and a cylindrical outer surface 24 into the wellbore 10, the casing 20 is cemented in the wellbore in accordance with the present invention.

Figure 2:
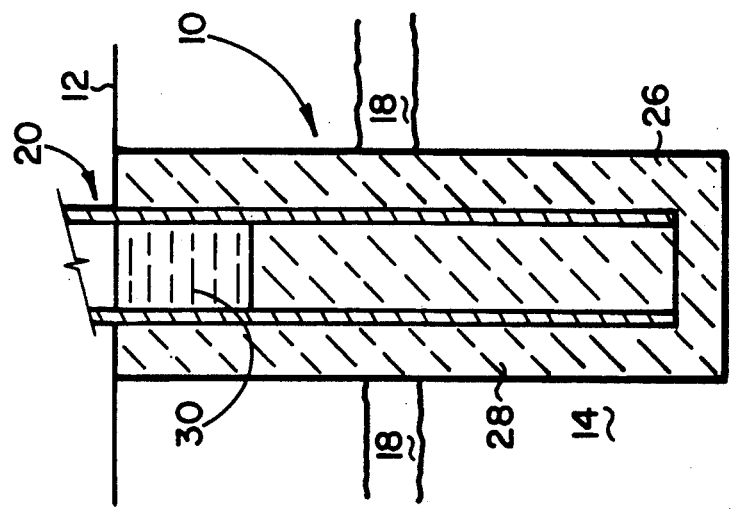
Figure 3:
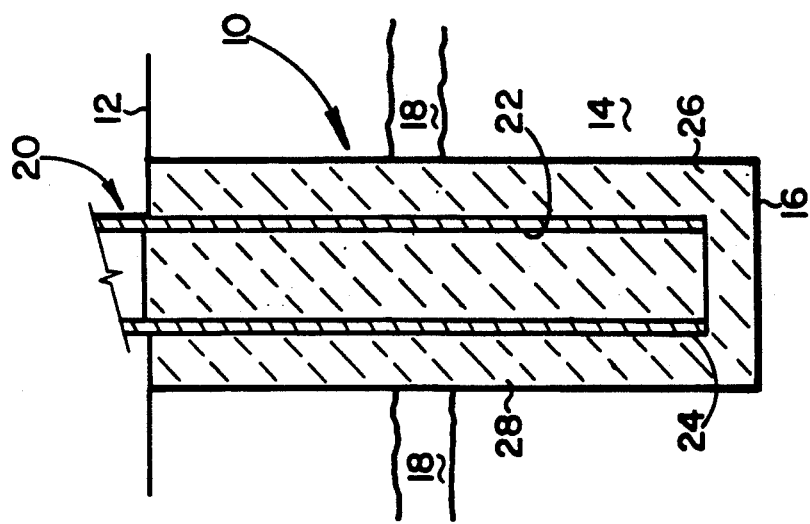

Initially, the wellbore 10 is filled with a fluid generally comprising drilling mud, well cuttings, and, possibly, wellbore fluids such as liquid or gaseous hydrocarbons, brines or other aqueous formation fluids. As shown in FIG. 1, the casing 20 has been positioned within the wellbore 10 and a fluid caliper 26 has been pumped into the wellbore 10. In accordance with common practice, the fluid caliper is pumped under pressure through the cylindrical bore of the casing to the bottom 16 of the wellbore 10 at which point it flows upwardly in the annular space 28 and back to the earth surface 12. In this process, the fluid caliper 26 performs two functions. First of all, it displaces a major portion of the drilling mud from the wellbore annulus 28 and it serves as a gauge for precisely measuring the volume of the wellbore 10 so that the proper amount of cement to be injected can be determined. A cement spacer 30 is then injected through the casing 20 (FIG. 2) to displace a portion of the fluid caliper 26 out of the wellbore 10. The cement spacer may be any cement slurry composition common in the art but is typically Class "A" or "G" cement as defined by API standards. The function of the cement spacer is to separate the fluid caliper 26 from those fluids which will follow it into the wellbore 10 and, additionally, to act as a final sweep to remove additional drilling mud left in place by the fluid caliper 26. Use of the spacer, however, is optional.

In accordance with the preferred embodiment of the invention, the cement spacer 30 is then displaced into the annular space 28 by the injection of a right-angle setting cement 32 through the casing 20. The amount of right-angle setting cement 32 injected into the wellbore 10 through the casing 20 is an amount which will substantially fill the volume between the surface 12 and the gas-bearing zone 18. It is critical to the proper execution of a cementing operation in accordance with the present invention that a substantial portion of the volume of the annular space 28 above the gas-bearing zone 18 and below the surface 12 be filled with the right-angle setting cement 32. However, it is essential that all of the right-angle setting cement 32 be positioned above the gas-bearing zone 18 in order to avoid gas channelling.

Figure 4:
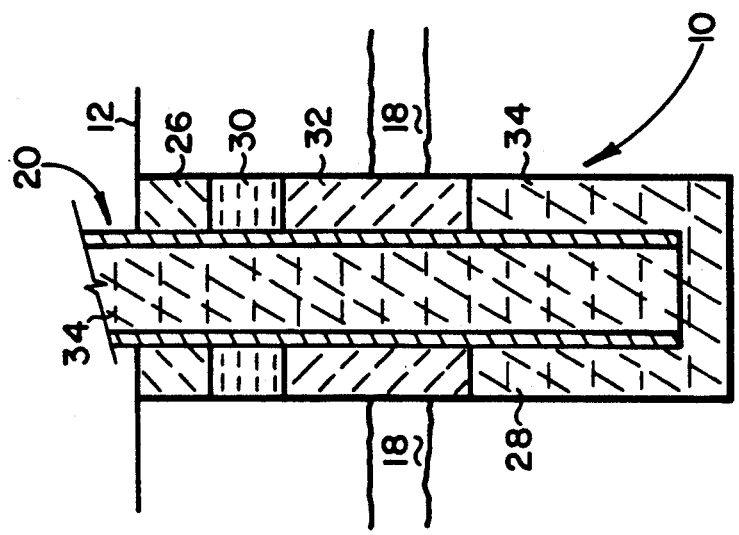

The right-angle setting cement 32 is displaced into the wellbore annulus 28 by the injection of a low fluid loss cement 34 (FIG. 4). The low fluid loss cement may be of any well-known low fluid loss type comprising a Class "A" or a Class "G" cement including any number of known polymer resins which give low fluid loss properties to the low fluid loss cement 34.

Figure 5:
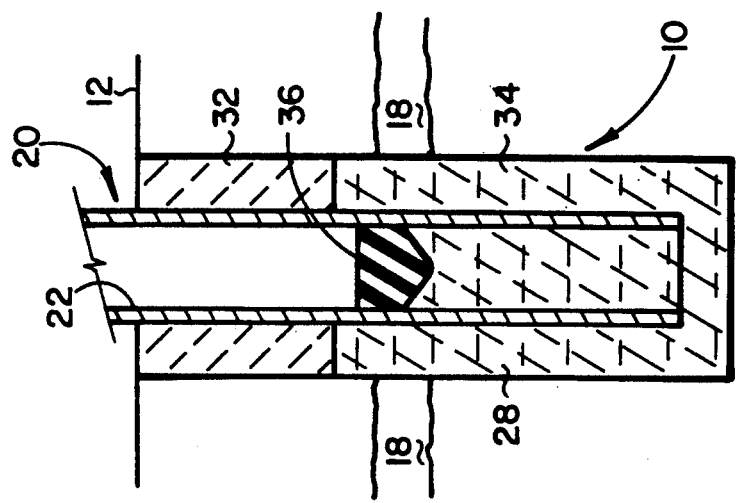

The amount of low fluid loss cement 34 which is pumped into the casing 20 is calculated so that an excess of the amount required to displace the right-angle setting cement 32 into position above the gas-bearing zone 18 is employed. A cement plug 36 is then injected into the cylindrical bore 22 of the casing 20 to displace a major portion of the low fluid loss cement 34 into the annulus 28 and to displace the right-angle setting cement 32 to the surface 12 in the annular space 28 so that the bottom 38 of the right-angle setting cement 32 is located above the gas-bearing zone 18 within the wellbore 10 (FIG. 5).

In accordance with the invention, additional pumping of the cement is stopped for a period of time to allow substantially complete setting of the right-angle setting cement 32 in position in the wellbore annulus 28 above the gas-bearing zone 18. This holding period for setting generally lasts for a period of thirty minutes to two hours.

Figure 6:
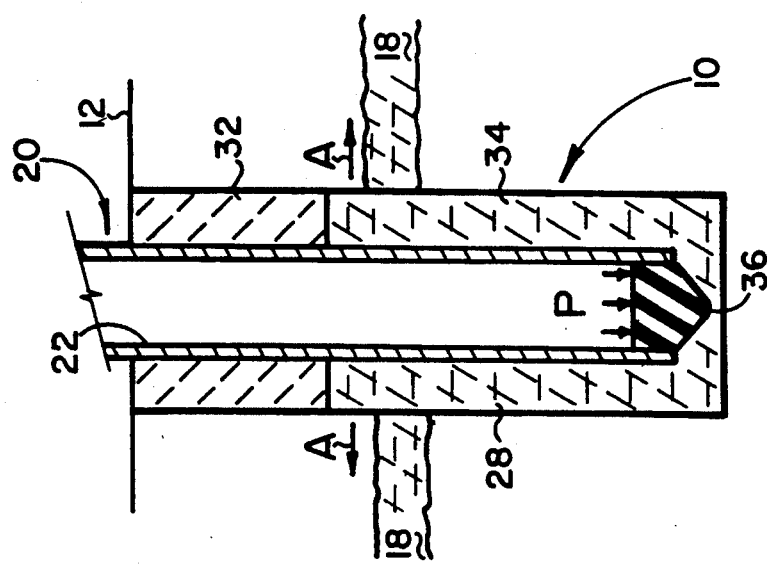

Following the setting of the right-angle setting cement 32, additional pumping pressure is applied to the cement plug 36 (FIG. 6) in the direction of the arrow P to displace the remaining portion of the low fluid loss cement 34 out of the cylindrical bore 22 of the casing 20. Since the right-angle setting cement 32 constitutes a solid plug in the annular space 28, at least a portion of the low fluid loss cement 34 is squeezed outwardly in the direction of the arrows A to seal off gas migration within the gas-bearing zone 18 (FIG. 6).

The right-angle setting cement used in accordance with the present invention may be of any type having the right-angle setting property. In accordance with the preferred embodiment of the invention, however, the right angle setting cement comprises a mixture of normal Portland cement and Gypsum which, when hydrated, forms a rigid interconnected crystalline structure. Normal Portland cement comprises four main crystalline groups which are tetracalcium aluminoferrite, tricalcium aluminate, tricalcium silicate and dicalcium silicate. Chemical composition of Gypsum is calcium sulfate. The Gypsum and normal Portland cement are mixed together in proportions of about 60% Gypsum and 40% normal Portland cement, together with a retarder and a dispersant to give mixability and controlled thickening time. Water is then added at the ratio of 0.37 cubic meters of water per tonne of cement.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. In wellbore penetrating the earth from a surface to subterranean formation including tubular surface casing having a central bore and an annulus between the surface casing and the wellbore, a process for cementing the casing and preventing gas migration from a shallow, over-pressured, gas-bearing zone penetrated by the wellbore comprising the steps of:

pumping a slug of right angle setting cement slurry into the casing;

pumping a slug of low fluid loss cement slurry into the casing above the right angle setting cement slurry to displace the slug of right angle setting cement slurry into the annulus;

inserting a bottom plug into the casing above the low fluid loss cement slurry;

pumping a pressurized fluid above said bottom plug to displace the right angle setting cement slurry to the surface and in the annulus above the gas-bearing zone and at least a portion of the low fluid loss cement slurry into the annulus;

stopping the pumping of the pressurized fluid for a period of time sufficient for the right angle setting cement slurry to set; and pumping additional pressurized fluid above said bottom plug to displace a remainder of the low fluid loss cement slurry into the annulus.

2. The process as set forth in claim 1 further including the step of gauging a volume of the wellbore prior to the step of pumping the slug of right-angle setting cement slurry into the casing by pumping a fluid caliper into the casing ahead of the slug of right-angle setting cement slurry.

3. The process as set forth in claim 2 further including the step of pumping a cement slurry spacer into the casing behind the fluid caliper and ahead of the right-angle setting cement slurry slug.

4. The process as set forth in claim 3 wherein the step of pumping the cement slurry spacer comprises pumping a cement slurry selected from a group consisting of Class "A" and Class "G" cement.

5. The process as set forth in claim 1 wherien the step of pumping a slug of right-angle setting cement slurry into the casing comprises pumping a cement slurry comprising a mixture of normal Portland cement and Gypsum into the casing.

* * * * *